US008627013B2

(12) United States Patent
Musumeci et al.

(10) Patent No.: US 8,627,013 B2
(45) Date of Patent: *Jan. 7, 2014

(54) METHODS AND SYSTEMS FOR CACHING DATA USING BEHAVIORAL EVENT CORRELATIONS

(75) Inventors: Gian-Paolo Musumeci, Berkeley, CA (US); Kristopher C. Wehner, Oakland, CA (US)

(73) Assignee: Aggregate Knowledge, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/235,219

(22) Filed: Sep. 16, 2011

(65) Prior Publication Data

US 2012/0011325 A1 Jan. 12, 2012

Related U.S. Application Data

(63) Continuation of application No. 12/214,511, filed on Jun. 18, 2008, now Pat. No. 8,032,714.

(60) Provisional application No. 60/995,896, filed on Sep. 28, 2007.

(51) Int. Cl.
*G06F 12/08* (2006.01)

(52) U.S. Cl.
USPC .......................................... 711/137; 711/141

(58) Field of Classification Search
None
See application file for complete search history.

(56) References Cited

U.S. PATENT DOCUMENTS

| 4,258,386 | A | 3/1981  | Cheung        |
| 4,546,382 | A | 10/1985 | McKenna et al.|
| 4,833,308 | A | 5/1989  | Humble        |
| 4,930,011 | A | 5/1990  | Kiewit        |
| 4,972,504 | A | 11/1990 | Daniel et al. |
| 5,019,961 | A | 5/1991  | Addesso et al.|
| 5,099,319 | A | 3/1992  | Esch          |
| 5,117,349 | A | 5/1992  | Tirfing et al.|
| 5,128,752 | A | 7/1992  | Von Kohorn    |
| 5,155,591 | A | 10/1992 | Wachob        |
| 5,201,010 | A | 4/1993  | Deaton et al. |
| 5,223,924 | A | 6/1993  | Strubbe       |
| 5,227,874 | A | 7/1993  | Von Kohorn    |
| 5,231,494 | A | 7/1993  | Wachob        |
| 5,237,620 | A | 8/1993  | Deaton et al. |
| 5,249,262 | A | 9/1993  | Baule         |

(Continued)

OTHER PUBLICATIONS

Beeferman, D., et al., "Agglomerative clustering of a search engine query log," (2000) Lycos Inc. and Carnegie Mellon University, 1-9.

(Continued)

*Primary Examiner* — Than Nguyen

(74) *Attorney, Agent, or Firm* — Mahamedi Paradice Kreisman LLP

(57) ABSTRACT

A method is disclosed including a client accessing a cache for a value of an object based on an object identification (ID), initiating a request to a cache loader if the cache does not include a value for the object, the cache loader performing a lookup in an object table for the object ID corresponding to the object, the cache loader retrieving a vector of execution context IDs, from an execution context table that correspond to the object IDs looked up in the object table and the cache loader performing an execution context lookup in an execution context table for every retrieved execution context ID in the vector to retrieve object IDs from an object vector.

15 Claims, 6 Drawing Sheets

(56) References Cited

U.S. PATENT DOCUMENTS

| | | |
|---|---|---|
| 5,285,278 A | 2/1994 | Holman |
| 5,305,196 A | 4/1994 | Deaton et al. |
| 5,315,093 A | 5/1994 | Stewart |
| 5,327,508 A | 7/1994 | Deaton et al. |
| 5,331,544 A | 7/1994 | Lu et al. |
| 5,351,075 A | 9/1994 | Herz et al. |
| 5,388,165 A | 2/1995 | Deaton et al. |
| 5,410,344 A | 4/1995 | Graves et al. |
| 5,430,644 A | 7/1995 | Deaton et al. |
| 5,446,919 A | 8/1995 | Wilkins |
| 5,448,471 A | 9/1995 | Deaton et al. |
| 5,471,610 A | 11/1995 | Kawaguchi et al. |
| 5,515,098 A | 5/1996 | Carles |
| 5,537,586 A | 7/1996 | Amram et al. |
| 5,544,049 A | 8/1996 | Henderson et al. |
| 5,559,549 A | 9/1996 | Hendricks et al. |
| 5,563,998 A | 10/1996 | Yaksich et al. |
| 5,563,999 A | 10/1996 | Yaksich et al. |
| 5,592,560 A | 1/1997 | Deaton et al. |
| 5,604,542 A | 2/1997 | Dedrick |
| 5,608,447 A | 3/1997 | Farry et al. |
| 5,619,709 A | 4/1997 | Caid et al. |
| 5,621,812 A | 4/1997 | Deaton et al. |
| 5,632,007 A | 5/1997 | Freeman |
| 5,636,346 A | 6/1997 | Saxe |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,186 A | 7/1997 | Ferguson |
| 5,659,469 A | 8/1997 | Deaton et al. |
| 5,661,516 A | 8/1997 | Carles |
| 5,675,662 A | 10/1997 | Deaton et al. |
| 5,687,322 A | 11/1997 | Deaton et al. |
| 5,704,017 A | 12/1997 | Heckerman et al. |
| 5,724,521 A | 3/1998 | Dedrick |
| 5,740,549 A | 4/1998 | Reilly et al. |
| 5,754,938 A | 5/1998 | Herz et al. |
| 5,754,939 A | 5/1998 | Herz et al. |
| 5,758,257 A | 5/1998 | Herz et al. |
| 5,758,259 A | 5/1998 | Lawler |
| 5,761,601 A | 6/1998 | Nemirofsky et al. |
| 5,761,662 A | 6/1998 | Dasan |
| 5,774,170 A | 6/1998 | Hite et al. |
| 5,774,868 A | 6/1998 | Cragun et al. |
| 5,786,845 A | 7/1998 | Tsuria |
| 5,794,210 A | 8/1998 | Goldhaber et al. |
| 5,796,952 A | 8/1998 | Davis et al. |
| 5,805,974 A | 9/1998 | Hite |
| 5,832,457 A | 11/1998 | O'Brien et al. |
| 5,835,087 A | 11/1998 | Herz et al. |
| 5,848,396 A | 12/1998 | Gerace |
| 5,867,799 A | 2/1999 | Lang et al. |
| 5,918,014 A | 6/1999 | Robinson |
| 5,926,205 A | 7/1999 | Krause |
| 5,930,764 A | 7/1999 | Melchione |
| 5,933,811 A | 8/1999 | Angles |
| 5,948,061 A | 9/1999 | Merriman et al. |
| 5,970,469 A | 10/1999 | Scroggie et al. |
| 5,974,396 A | 10/1999 | Anderson et al. |
| 5,974,399 A | 10/1999 | Giuliani et al. |
| 5,977,964 A | 11/1999 | Williams et al. |
| 5,978,799 A | 11/1999 | Hirsch |
| 5,991,735 A | 11/1999 | Gerace |
| 6,002,393 A | 12/1999 | Hite et al. |
| 6,005,597 A | 12/1999 | Barrett et al. |
| 6,009,409 A | 12/1999 | Adler |
| 6,009,410 A | 12/1999 | LeMole |
| 6,012,051 A | 1/2000 | Sammon, Jr. |
| 6,014,634 A | 1/2000 | Scroggie et al. |
| 6,020,883 A | 2/2000 | Herz et al. |
| 6,026,370 A | 2/2000 | Jermyn |
| 6,029,195 A | 2/2000 | Herz |
| 6,035,280 A | 3/2000 | Christensen |
| 6,038,591 A | 3/2000 | Wolfe |
| 6,055,573 A | 4/2000 | Gardenswartz |
| 6,067,565 A * | 5/2000 | Horvitz .................... 709/218 |
| 6,084,628 A | 7/2000 | Sawyer |
| 6,088,510 A | 7/2000 | Sims |
| 6,088,722 A | 7/2000 | Herz et al. |
| 6,119,098 A | 9/2000 | Guyot et al. |
| 6,134,532 A | 10/2000 | Lazarus et al. |
| 6,160,570 A | 12/2000 | Sitnik |
| 6,160,989 A | 12/2000 | Hendricks et al. |
| 6,177,931 B1 | 1/2001 | Alexander et al. |
| 6,185,541 B1 | 2/2001 | Scroggie et al. |
| 6,216,129 B1 | 4/2001 | Eldering |
| 6,236,978 B1 | 5/2001 | Tuzhilin |
| 6,266,649 B1 | 7/2001 | Linden et al. |
| 6,285,999 B1 | 9/2001 | Page |
| 6,298,348 B1 | 10/2001 | Eldering |
| 6,317,722 B1 | 11/2001 | Jacobi et al. |
| 6,321,221 B1 | 11/2001 | Bieganski |
| 6,327,574 B1 | 12/2001 | Kramer et al. |
| 6,415,368 B1 | 7/2002 | Glance et al. |
| 6,438,579 B1 | 8/2002 | Hosken |
| 6,457,010 B1 | 9/2002 | Eldering et al. |
| 6,542,878 B1 | 4/2003 | Heckerman et al. |
| 6,560,578 B2 | 5/2003 | Eldering |
| 6,571,279 B1 | 5/2003 | Herz et al. |
| 6,592,612 B1 | 7/2003 | Samson et al. |
| 6,631,451 B2 | 10/2003 | Glance et al. |
| 6,643,696 B2 | 11/2003 | Davis et al. |
| 6,820,062 B1 | 11/2004 | Gupta et al. |
| 6,871,186 B1 | 3/2005 | Tuzhilin et al. |
| 6,920,478 B2 | 7/2005 | Mendiola et al. |
| 7,062,510 B1 | 6/2006 | Eldering |
| 7,069,272 B2 | 6/2006 | Snyder |
| 7,080,070 B1 | 7/2006 | Gavarini |
| 7,113,917 B2 | 9/2006 | Jacobi et al. |
| 7,216,123 B2 | 5/2007 | Kamvar et al. |
| 7,337,214 B2 | 2/2008 | Douglass et al. |
| 7,370,004 B1 | 5/2008 | Patel et al. |
| 7,483,871 B2 | 1/2009 | Herz |
| 7,685,074 B2 | 3/2010 | Linden |
| 7,693,827 B2 | 4/2010 | Zamir et al. |
| 7,698,270 B2 | 4/2010 | Brave et al. |
| 7,974,714 B2 | 7/2011 | Hoffberg |
| 8,032,714 B2 | 10/2011 | Musumeci et al. |
| 2001/0014868 A1 | 8/2001 | Herz et al. |
| 2001/0021914 A1 | 9/2001 | Jacobi et al. |
| 2002/0095676 A1 | 7/2002 | Knee |
| 2002/0099812 A1 | 7/2002 | Davis |
| 2002/0143916 A1 | 10/2002 | Mendiola et al. |
| 2002/0147895 A1 | 10/2002 | Glance et al. |
| 2002/0194058 A1 | 12/2002 | Eldering |
| 2003/0037041 A1 | 2/2003 | Hertz |
| 2003/0088872 A1 | 5/2003 | Maissel et al. |
| 2003/0154442 A1 | 8/2003 | Papierniak |
| 2004/0088300 A1 | 5/2004 | Avery et al. |
| 2004/0122910 A1 | 6/2004 | Douglass et al. |
| 2004/0225578 A1 | 11/2004 | Hager et al. |
| 2005/0071251 A1* | 3/2005 | Linden et al. .................... 705/26 |
| 2006/0200556 A1 | 9/2006 | Brave et al. |
| 2007/0053513 A1 | 3/2007 | Hoffberg |
| 2009/0089259 A1 | 4/2009 | Musumeci et al. |

OTHER PUBLICATIONS

Billsus, D., et al., "Learning Collaborative Information Filters," (1998) Dept. of Information and Computer Science, University of California, Irvine, 1-9.

Boutilier, C., et al., "Active Collaborative Filtering," (2003) Dept. of Computer Science, University of Toronto, 1-18.

Brin, S., et al., "Dynamic Itemset Counting and Implication Rules for Market Basket Data," (1997) Dept. of Computer Science, Stanford University, 1-10.

Butte, A.J., et al., "Mutual Information Relevance Networks: Functional Genomic Clustering Using Pairwise Entropy Measurements," (2000) Pac. Sym. Biocomputing, 5:415-426.

Claypool, M., et al., "Combining Content-based and Collaborative Filters in an Online Newspaper," (1999) Computer Science Dept., Worcester Polytechnic Institute, 1-16.

(56) References Cited

OTHER PUBLICATIONS

Dhillon, I., et al., "Information-Theoretic Co-clustering," (2003) Dept. of Computer Sciences, University of Texas, Austin, 1-10.
Keerthi, S., "Support Vector Machines," (2006) Yahoo! Research Labs, 1-8.
Madani, O., et al., "Using (Graphical) Probabilistic Generative Models for Recommendation," (2008) Yahoo! Research Labs, 1-22.
Mehta, B., "A New Hope: Robust Collaborative Filtering," (2007) L3S Research Center and Google Inc., 1-35.
Paulson, P., et al., "Combining Collaborative and Content-based Filtering Using Conceptual Graphs," (2003) 1-15.
Pazzani, M., et al., "A Framework for Collaborative, Content-based and Demographic Filtering," (1999) Dept. of Information and Computer Science, UC Irvine, 1-16.
Sarwar, B., et al., "Analysis of Recommendation Algorithms for E-Commerce," (2000) Department of Computer Science and Engineering, University of Minnesota, 1-8.
Sarwar, B., et al., "Item-based Collaborative Filtering Recommendation Algorithms," (2001) Dept. of Computer Science and Engineering, University of Minnesota, 1-15.
Sarwar, B., et al., "Recommender Systems for Large-scale E-Commerce: Scalable Neighborhood Formation Using Clustering," (2002) Dept. of Comp. Sci. & Engg., U. Minnesota, 1-6.
Silverstein, et al., "Beyond Market Baskets: Generalizing Association Rules to Dependence Rules," (1998) Dept. of Computer Science, Stanford University, 1-30.
Singhal, A., et al., "Pivoted Document Length Normalization," (1996) Dept. of Computer Science, Cornell University, 1-9.
Ungar, L., et al., "Clustering Methods for Collaborative Filtering," (1998) Dept of Statistics, University of Pennsylvania, 1-10.
van der Weide, Th.P., et al., "Measuring the Incremental Information Value of Documents," (2006) Radboud University Nijmegen, The Netherlands, 1-26.
Wietsma, R., et al., "Product Reviews in Mobile Decision Aid Systems," (2006) eCommerce and Tourism Research Laboratory, ITC-irst, Trento, Italy, 1-4.
Yip, et al., "The Generalized Topological Overlap Matrix for Detecting Modules in Gene Networks," (2006) National University of Singapore and UCLA, 1-7.
Vogt, C., "Passive Feedback Collection—An Attempt to Debunk the Myth of Clickthroughs," (2000) Comp. Sci., Math & Physics Depts., Chapman University, 1-9.
Watts, D., et al., "Collective Dynamics of 'Small-world' Networks," (1998) Nature, 393:440-442.
Chen, K., et al., "Eliminating Public Knowledge Biases in Information—Aggregation Mechanisms," (2004) Management Science, 50(7):983-994.
van der Weide, Th.P., et al., "Individual and Collective Approaches for Searcher Satisfaction in IR," (1998) Dept. of Info Systems, U. Nijmegen, The Netherlands, 1-12.
Fraley, C., et al., "MCLUST Version 3: An R Package for Normal Mixture Modeling and Model-based Clustering (Technical Report No. 504)", (2006) U. Washington, 1-45.
Herlocker, et al., "Evaluating Collaborative Filtering Recommender Systems," (2004) Oregon State University and University of Minnesota, 1-49.
Bittner, M., et al., "Molecular Classification of Cutaneous Malignant Melanoma by Gene Expression Profiling," (2000) Nature, 406:535-537.
Radlinski, F., et al., "Active Exploration for Learning Rankings from Clickthrough Data," (2007) Dept. of Computer Science, Cornell University, 1-10.
Broder, A., et al., "Min-wise Independent Permutations," (2000) Journal of Computer and System Sciences, 60:630-659.
Linden, G., et al., "Amazon.com Recommendations: Item-to-item Collaborative Filtering," (Jan./Feb. 2003) IEEE Computer Society, 76-80.
Craswell, N., et al., "An Experimental Comparison of Click Position-Bias Models," (2008) Microsoft Research, 1-8.
Cosley, et al., "Referee: An Open Framework for Practical Testing of Recommender Systems Using Research Index," (2002) Proc. 28th VLDB Conference, Hong Kong, China, 1-12.
Gunduz, S., et al., "A Web Page Prediction Model Based on Clickstream Tree Representation of User Behavior," (2003) Istanbul Technical U., Turkey & U. Waterloo, Canada, 1-7.
Pennock, D., et al., "Collaborative Filtering by Personality Diagnosis: A Hybrid Memory-and Model-based Approach," (2000) Proc. 16th Conf. Uncert. Artificial Intel., 473-480.
Madani, O., et al., "Contextual Recommender Problems," (2005) Yahoo! Research Labs, 1-4.
Joachims, T., "Evaluating Search Engines Using Clickthrough Data (Draft)," (2002) Dept. of Computer Science, Cornell University, 1-13.
Tintarev, N., "Explanations of Recommendations," (2007) University of Aberdeen, Scotland, 1-5.
Das, A., et al., "Google News Personalization: Scalable Online Collaborative Filtering," (2007) Track: Industr.Pract. & Exper., May 8-12, Banff, Alberta, Canada, 271-281.
Schein, A., et al., "Methods and Metrics for Cold-start Recommendations," (2002) Proc. 25th Ann. Int'l ACM SIGIR Conf. R&D, Information Retrieval, 253-260.
Lawrence, R., et al., "Personalization of Supermarket Product Recommendations," (2000) IBM Research Report, IBM Research Division, 1-28.
Mulpuru, S., "Which Personalization Tools Work for eCommerce—And Why," (2007) eBusiness, Channel & Product Management Professionals, 1-22.
Wei, Y., et al., "Learning Users' Interests by Quality Classification in Market-based Recommender Systems," (2005) IEEE Trans. Know. & Data Engg., 1-27.
Charikar, M., "Similarity Estimation Techniques from Rounding Algorithms," (2002) Dept. of Computer Science, Princeton University, 1-9.
Heymann, P., et al., "Can Social Bookmarking Improve Web Search?" (2007) Infolab Technical Report 2007-33, Stanford University, 1-10.
Kwok-Wai, C., et al., "Mining Customer Product Ratings for Personalized Marketing," (2003) Decision Support Systems 35, 231-243.

* cited by examiner

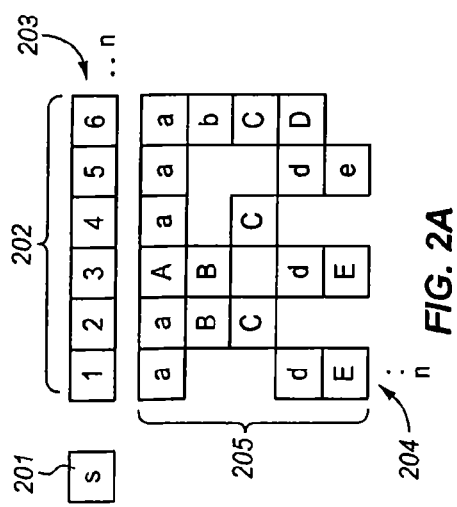
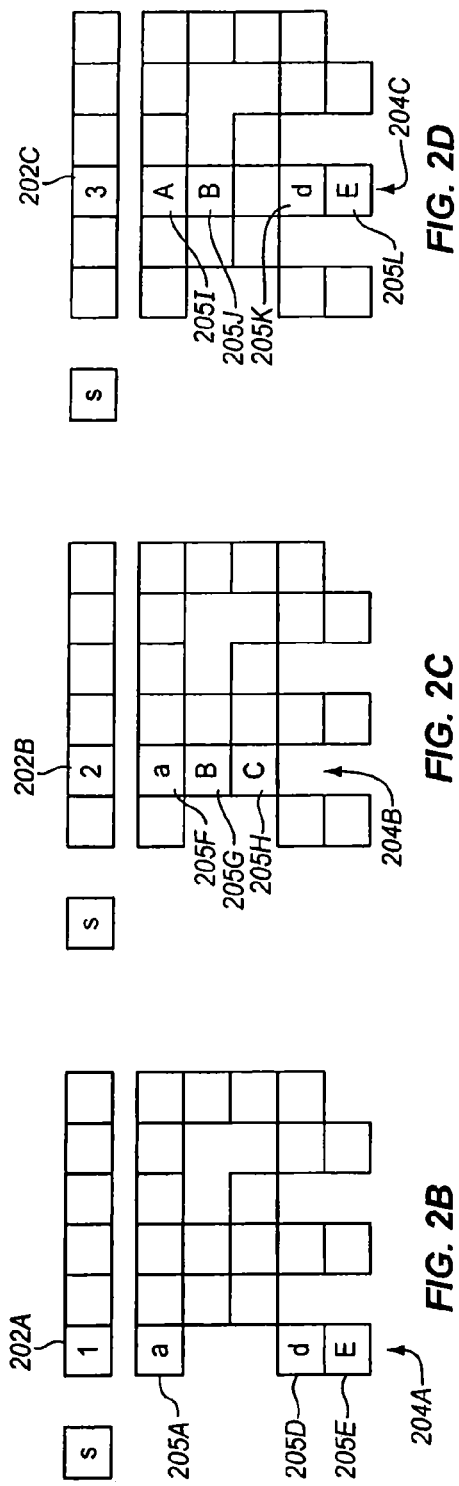
FIG. 2A
FIG. 2B
FIG. 2C
FIG. 2D

METHODS AND SYSTEMS FOR CACHING DATA USING BEHAVIORAL EVENT CORRELATIONS

This application is a continuation of U.S. non-provisional application Ser. No. 12/214,511, filed on Jun. 18, 2008, which application claims the benefit of U.S. provisional application Ser. No. 60/995,896, filed on Sep. 28, 2007. All of the aforementioned priority applications are hereby incorporated by reference in their entirety.

COPYRIGHT AUTHORIZATION

A portion of the disclosure of this patent document may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to using behavioral event driven data to perform predictive cache population. More specifically the invention relates to using of a behavioral event correlation system to make predictions regarding entries that are to be populated in a cache.

BACKGROUND

Algorithms controlling cache behavior have traditionally been of interest to computer scientists. Particularly, research has focused on a question at the root of cache behavior as to how to predict what resources will be accessed next. This issue drives both choosing which items to evict from a cache when it reaches the limits of its size, as well as techniques for selectively populating the cache with items in advance of their expected need.

In general, a cache is a region of relatively fast data storage used to store frequently used items from a larger region of relatively slow data storage. Without loss of generality, these regions could be main memory and a disk, a processor cache and main memory, etc; their performance relative to each other is important.

Recommended algorithms have been used to create static pre-computations of item relationships that implement a large amount of storage and typically cannot be done in real time. This static pre-computation, which traditionally builds and stores a matrix of item relationships, is too space inefficient and complex to use as a cache prediction mechanism for anything but the most expensive cached results. Static pre-computation also suffers from a very serious problem of being insufficiently reactive to changes in system behavior, which ultimately undermines its effectiveness as a cache prediction algorithm in all but the most coarse-grained contexts.

In order for a cache prediction algorithm to logically be useful, it should be cheaper to compute than the operation itself. Traditionally, most cache prediction mechanisms have focused on very cheap first-order approximations of the relative usefulness of a given cache entry. The usefulness of a cache entry is almost always defined by its probability of subsequent access. In order to do this, traditional cache prediction mechanisms focus on how recently a given item was accessed, or on statistics of data page sizes and very high-level approximations.

For example, devices in I/O paths generally pre-fetch as much data as possible: a 1 KB read from an application might be turned into an 8 KB read in the operating system (with the remaining 7 KB cached), and the disk that actually satisfies the request might read 64 KB from the platters into its local memory. This is a performance advantage because the latency associated with preparing to satisfy a disk request is quite high since it is advantageous to read as much data as possible while the heads and platters are in the correct configuration.

This is a performance advantage because the differences in latencies are very high, and there is generally a computational (rather than I/O) component that separates I/O requests. This simple scheme is based on the principle of spatial locality such that items that are accessed together tend to be located together (for example, if you read the third paragraph of this document, you are likely to read the fourth paragraph as well). Unfortunately, that scheme is not able to pre-fetch the next document you will read because the latency involved in getting the next document might be quite significant, as no caching is available to help.

Therefore what has been needed is a system and method for the dynamic generation of correlation scores between arbitrary objects to create a list of correlated items.

SUMMARY

According to one embodiment, a method is disclosed. The method includes a client accessing a cache for a value of an object based on an object identification (ID), initiating a request to a cache loader if the cache does not include a value for the object, the cache loader performing a lookup in an object table for the object ID corresponding to the object, the cache loader retrieving a vector of execution context IDs, from an execution context table that correspond to the object IDs looked up in the object table and the cache loader performing an execution context lookup in an execution context table for every retrieved execution context ID in the vector to retrieve object IDs from an object vector.

In a further embodiment, a system is disclosed. The system includes a client, a cache to receive access requests from the client to retrieve a value of an object based on an object ID, an object table and an execution context table. The system also includes a cache loader that receives a request if the cache does not include a value for the object, performs a lookup in the object table for the object ID corresponding to the object, retrieves a vector of execution context IDs from the execution context table that correspond to the object IDs looked up in the object table and performs an execution context lookup in an execution context table for every retrieved execution context ID in the vector to retrieve object IDs from an object vector.

BRIEF DESCRIPTION OF THE DRAWINGS

The inventive body of work will be readily understood by referring to the following detailed description in conjunction with the accompanying drawings, in which:

FIGS. 2A-2G illustrate one embodiment of a sequence of events for establishing a seed list to generate a list of correlated objects.

DETAILED DESCRIPTION

Figure 1:
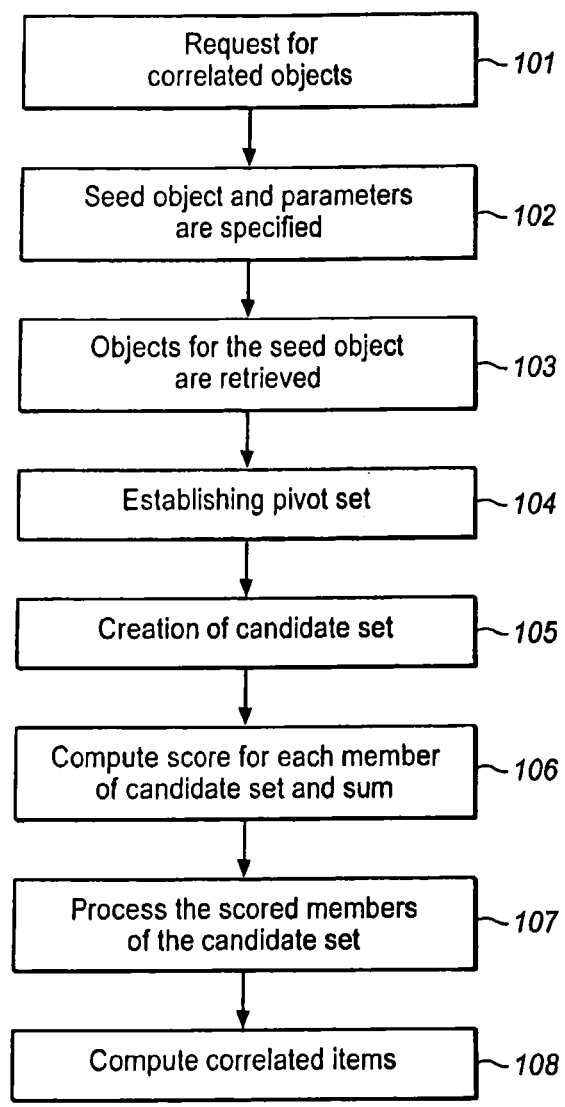
FIG. 1 is a flow chart illustrating one embodiment a technique for the dynamic generation of correlation scores between arbitrary objects for creating a list of correlated items.

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

According to one embodiment, objects relating to a cache memory are uniquely identified in some common namespace (e.g., inode numbers in a file system, or memory address locations). An object may be relatively coarse (e.g., a file) or relatively fine (e.g., a block of memory). In a further embodiment, each context of execution (e.g., thread, process, etc.) is uniquely identifiable.

In a further embodiment, tables of relationships between execution contexts and system objects are dynamically generated, with a correlation score of object to other objects computed by dynamic examination of table contents. In one embodiment, the system maintains two tables, the contents of each of which is a set of vectors. In one table the key values are the identifications (IDs) of the execution contexts, and the vectors include the object IDs of each object they have accessed in a predefined time period.

The second table is the mirror image of the first table where the key values are the object IDs of the objects themselves, and the vectors are the list of execution contexts in which they were accessed. In one embodiment, the contents of these vectors are stored in time order. However in other embodiments, the vector contents may be stored based upon other parameters as well.

Embodiments of the invention may include various processes as set forth below. The processes may be embodied in machine-executable instructions. The instructions can be used to cause a general-purpose or special-purpose processor to perform certain steps. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the pre-transmitted invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Score Correlation

FIG. 1 is a flow chart illustrating one embodiment of the dynamic generation of correlation scores between arbitrary objects to create a list of correlated items. In processing block 101 a list of correlated objects is requested as a result of an external request for recommended content. In processing block 102, a seed object, such as a person or an item that is being viewed, and a set of parameters are specified, either statically as configuration information or dynamically with the input request, is created.

These parameters may include restrictions (for example, only to consider certain types of behavior) or other options that modify the runtime behavior of an algorithm. In processing block 103, a list of objects for the seed object is then retrieved via a lookup of stored relationship data in a storage table. The list is then restricted appropriately by whatever may have been specified in the set of parameters, thus establishing a pivot set, processing block 104. In processing block 105, each object that has interacted with all members of the pivot set are determined by applying appropriate restrictions creating a candidate set.

In processing block 106 as the candidate set is generated, a score for each member of the pivot set's contribution is computed, and these scores are summed. In one embodiment, these summed values include a histogram that is input to the scoring algorithm. In processing block 107, the scored members of the candidate set are then processed by a scoring algorithm, such as the vector cosine or Pearson's R. At processing block 108, the scores are sorted to compute a list of correlated items. In one embodiment, each component of this process is computed on a single processor. In another embodiment, processing blocks 103, 104, 105, 106, 107 and 108 may each be computed in parallel on multiple processors or in a distributed fashion across multiple systems.

In one embodiment, an entity is something about which information can be gathered. An entity can be uniquely identified through the assignation of a unique numerical value or through some other process. Entities can be broadly grouped together into types. For example, all people might be grouped together into a "people" type. This type information may be encoded into the uniquely identifying value described above.

Entities are logically linked by classification events. A classification event may be the result of behavioral observations, textual analysis, or some other means of associating one entity with another. For example, a classification event can be decomposed into a binary expression A * B, where the * operator implies action. For example, "user U loads Web page W" could be expressed as U * W, "label L applies to item I" could be expressed as L * I or "user U played song S" as U * S. Information about entities is stored in a data store.

The data store may be represented through any of several different mechanisms: a hash table, a balanced tree such as a Red-Black Tree, or some other data structure. The data store provides the ability, given an entity, to look up all other entities that have been associated with the particular entity. This information may be stored as an ordered list or some other data structure. Other information may be stored as well. For example, the time might be recorded, the intent that gave rise to the classification event (e.g., a person purchasing an item), or business level metadata about the transaction (sale status for a product, mature content flags for an article, etc.). An association method is used to generate a list of entities that are related to some other item. The process of association requires at least one initial entity, the seed, and a series of parameters. These parameters may include restrictions placed on the members of both the complete pivot set and partial candidate sets.

Figure 2E:
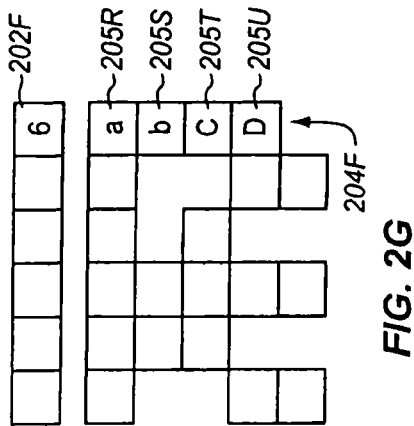

FIGS. 2A-2G depict diagrams in accordance with an embodiment of the present invention. In FIG. 2A the seed entity "S" 201 is depicted. Seed entity 201 is generated either by the user's interaction with the seed item, or as the user themselves. The list of entities 202 associated with the seed entity 201 is retrieved via a table lookup for all entities with which it is associated, producing the pivot set 203. Each entity 202 in the pivot set 203 is inspected in turn. If the entity 202 in the pivot set 203 does not meet the restriction criteria established (e.g., if purchase information is not being considered and the relationship represents a purchase), then it is excluded from further consideration, and we move on to the next entity 202 in the pivot set 203.

In the event that the entity 202 in the pivot set 203 is not excluded, then the list entities 205 associated with this particular entity 202 in the pivot set 203 is retrieved, producing a partial candidate set 204. Each list entity 205 in the partial candidate set 204 is inspected in turn. The list entity 205 may be excluded from further consideration by the established restriction criteria (e.g., if the relationship represents a view of an item, and only purchase data is being considered), we move on to the next list entity 205 in the partial candidate set 204.

Otherwise, the list entity 205 is assigned a raw score. Restriction criteria are based on a number of factors, such as the semantic relationship (intent) associated with the list entity's 205 inclusion in the partial candidate list 204 or some other criteria. A running sum of raw scores, each of which represents a weighted relationship between an item in the pivot set and the candidate set, for each list entity 205 is maintained, and is not depicted here. Based upon the summation of raw scores and the final scoring algorithm, entities will be generated for serving to a website or end user, not depicted here.

Referring now to FIG. 2B inspection of entity "1" 202A and its partial candidate set 204A is performed. In FIG. 2B, list entities "a" 205A and "d" 205D fail to meet the criteria for further consideration, and are thus represented in lower case letters. Entity "E" meets the criteria, and is therefore represented in upper case. In FIG. 2C inspection of entity "2" 20213 and its partial candidate set 204B is performed, list entity "a" 205F fails to meet the criteria for further consideration. List entities "B" 205G and "C" 205H meet the criteria. In FIG. 2D inspection of list entity "3" 202C and its partial candidate set 204C is performed "a" "b" and "e" represented by 205I, 205J and 205 L respectively, do not qualify list entity "D" 205K qualifies.

Figure 2F:
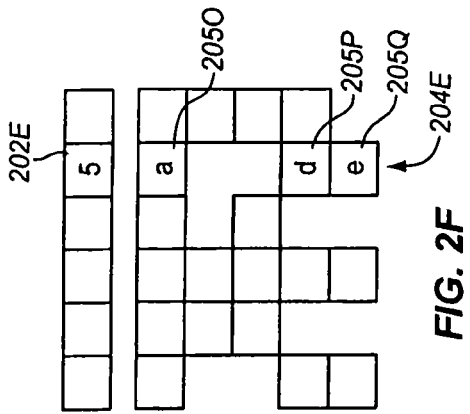

In FIG. 2E, inspection of entity "4" 202D is performed. List entity "a" 205M qualifies and list entity "c" 205N does not. In FIG. 2F no list entity 205 in the candidate set 204E for entity "5" 202E has met the criteria. Entity "5", 202E is excluded from the pivot set, and has been disregarded and its corresponding list entities are never examined during candidate set creation.

Figure 2G:
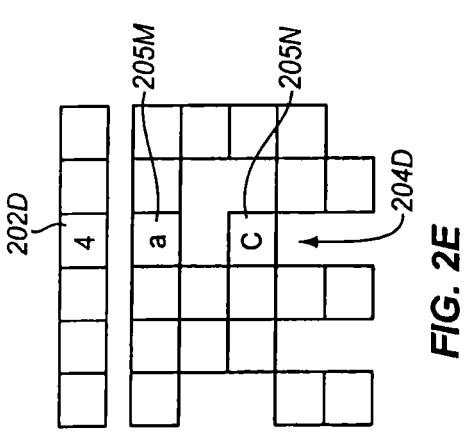

In FIG. 2G inspection of entity "6" and its partial candidate set 204F is performed. List entities "a" 205R and "b" 205S do not meet the criteria, list entities "C" 205T and "D" 205U meet the criteria. The raw scores for each entity, which are computed as a sum of the number of relationships between pivot items and candidate items which meet the criteria, can then be processed by a scoring algorithm, such as the vector cosine or Pearson's R. The results can then be sorted, either by the output score or some other pre-established criteria, to compute a list of associated entities suitable for input into a display mechanism. Although the foregoing embodiment shows a finite pivot set, a finite set of entities and a finite partial candidate set it should be understood that the invention is not so limited and are limited in order to simplify and clarify the present description.

System Overview

Figure 3:
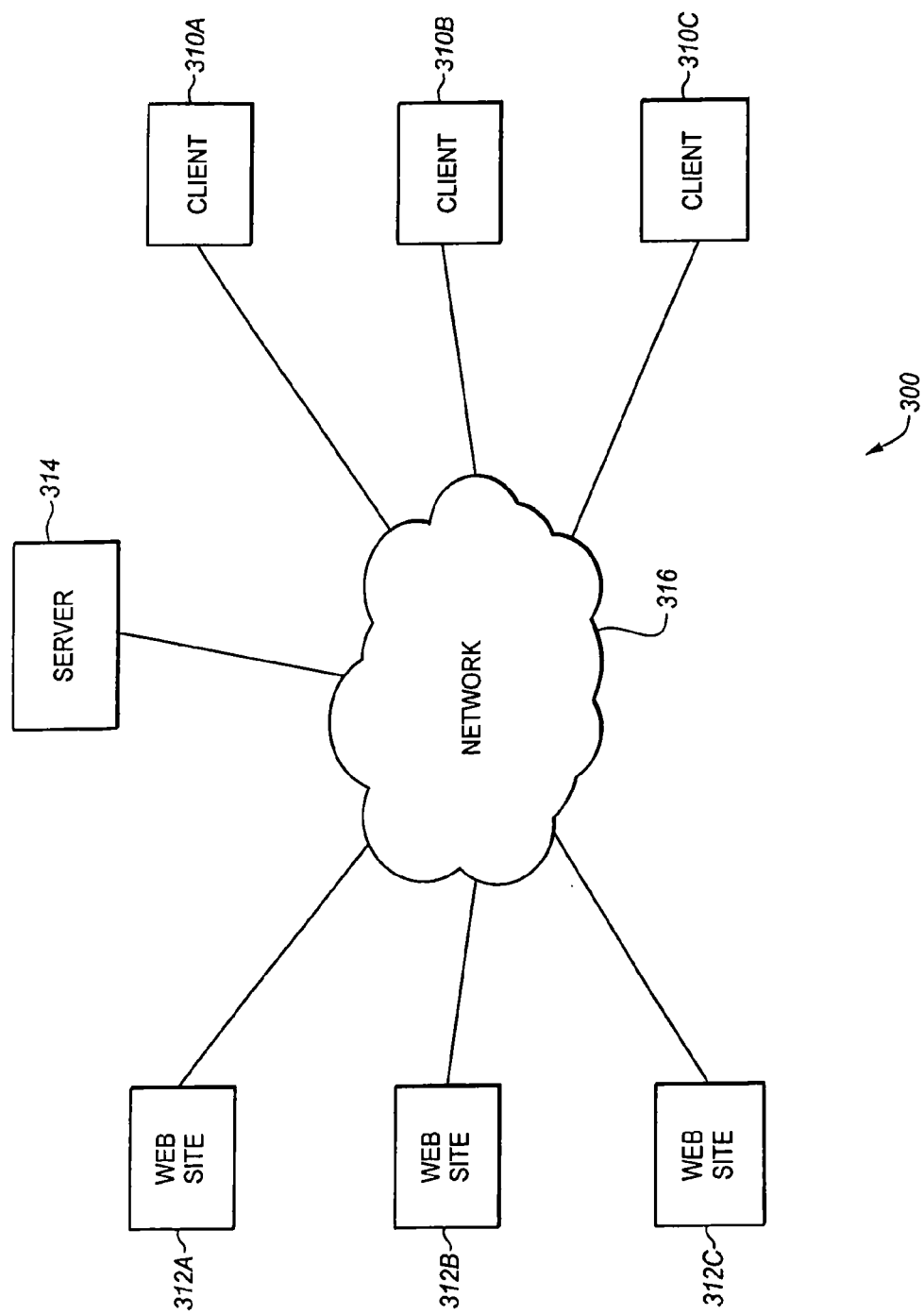
FIG. 3 is a high-level block diagram of one embodiment a computing environment according to one embodiment of the present invention.

FIG. 3 is a high-level block diagram of a computing environment 300 according to one embodiment of the present invention. FIG. 3 illustrates three client computers 310A, 310B, 310C, three web sites 312A, 312B, 312C, and a server 314 connected by a network 316. At the highest level, end-users of the clients 310 interact with the web sites 312 to establish relationships. The web sites 312 and/or the clients 310 in one embodiment describe these relationships to the server 314 in other embodiments the server determines the relationships. The server 314 uses the techniques described above in connection with FIGS. 2A-2G and/or other techniques to process correlations in real time to compute lists of highly relevant items, The client 310 in this embodiment represents a computer that is used by an end-user to interact with the web sites 312 and/or server 314 via the network 316. The client 310 can be, for example, a personal computer or another network-capable device, such as a personal digital assistant (PDA), a cellular telephone, a pager, a video game system, a television "set-top box" etc. Although FIG, 3 illustrates only three clients 310, embodiments of the present invention can have thousands or millions of clients participating in the environment 300 described herein. Three clients 310 are illustrated in order to simplify and clarify the present description.

The web sites 312 are locations on the network 316 that provide web pages to the clients 310 via the network 316. The web sites 312 can be, for example, media sites that primarily provide content such as news to the end-users, retailer sites that enable the end-users to purchase items, social networking sites that enable end-users to interact with other people, and hybrid sites that provide a mix of these features. Those of skill in the art will recognize that there may be an unlimited number of different types of web sites 312 with which the clients 310 can interact. Although FIG. 3 illustrates only three web sites 312, embodiments of the present invention can have many web sites. Only three websites 312 are illustrated in order to simplify and clarify the present description. The web sites 312 need not be related or associated with each other.

The end-users of the clients 310 interact with the web sites 312 to establish relationships. For example, assume an end-user views a web page for a digital camera, and then views a web page for a memory card for that camera. These actions create relationships between the end-user and the camera, and between the end-user and the memory card. The web sites 312 observe relationships such as these, and provide messages to the server 314 describing them.

In addition, the web sites 312 receive recommendations from the server 314. These recommendations are provided to the end-users, typically by including the recommendations on web pages served to the end-users' clients 310. The recommendations can be for arbitrary and/or heterogeneous items and the web sites can request that the server 314 provide recommendations for only specified types of items. For example, the recommendations can include items an end-user might want to purchase, news stories the end-user might want to read, bands the end-user might like, discussion groups in which the end-user might want to participate, etc.

The server 314 receives descriptions of relationships from the web sites 312 and/or clients 310 and provides recommendations in return. In one embodiment, the server 314 performs collaborative filtering on the received relationships to generate the recommendations. In other embodiments, the server 314 performs the method of FIG. 1 to generate at least one list of items to an end user 310. The relationships can be from multiple web sites 312 or a single website 312 and/or multiple clients 310 or a single client 310, they can form a large pool of data on which the recommendations are based. Moreover, in some embodiments the relationships created by end-users are tracked across multiple web sites 312, meaning that the recommendations are based on a larger set of relationships established by that end-user.

The network 316 represents the communication pathways between the clients 310, web sites 312, and server 314. In one embodiment, the network 316 is the Internet. The network 316 can also utilize dedicated or private communications links that are not necessarily part of the Internet. In one embodiment, the network 316 uses standard communications technologies and/or protocols. Thus, the network 316 can include links using technologies such as 802.11, integrated services digital network (ISDN), digital subscriber line (DSL), asynchronous transfer mode (ATM), etc.

Similarly, the networking protocols used on the network 316 can include multi-protocol label switching (MPLS), the transmission control protocol/Internet protocol (TCP/IP), the hypertext transport protocol (HTTP), the simple mail transfer protocol (SMTP), the file transfer protocol (FTP), etc. The data exchanged over the network 316 can be represented using technologies and/or formats including the hypertext markup language (HTML), the extensible markup language (XML), the web services description language (WSDL), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

FIG, 4 is a high-level block diagram illustrating a functional view of a typical computer 400 for use as one of the entities illustrated in the environment 300 of FIG. 3 according to one embodiment. Illustrated are at least one processor 402 coupled to a bus 404. Also coupled to the bus 404 are a memory 406, a storage device 408, a keyboard 410, a graphics adapter 412, a pointing device 414, and a network adapter 416, A display 418 is coupled to the graphics adapter 412.

The processor 402 may be any general-purpose processor such as an INTEL x86, SUN MICROSYSTEMS SPARC, or POWERPC compatible-CPU. The storage device 1008 is, in one embodiment, a hard disk drive but can also be any other device capable of storing data, such as a writeable compact disk (CD) or DVD, or a solid-state memory device. The memory 406 may be, for example, firmware, read-only memory (ROM), non-volatile random access memory (NVRAM), and/or RAM, and holds instructions and data used by the processor 402. The pointing device 414 may be a mouse, track ball, or other type of pointing device, and is used in combination with the keyboard 410 to input data into the computer system 400. The graphics adapter 412 displays images and other information on the display 418. The network adapter 416 couples the computer system 400 to the network 408.

As is known in the art, the computer 400 is adapted to execute computer program modules. As used herein, the term "module" refers to computer program logic and/or data for providing the specified functionality. A module can be implemented in hardware, firmware, and/or software. In one embodiment, the modules are stored on the storage device 408, loaded into the memory 406, and executed by the processor 402.

Figure 4:
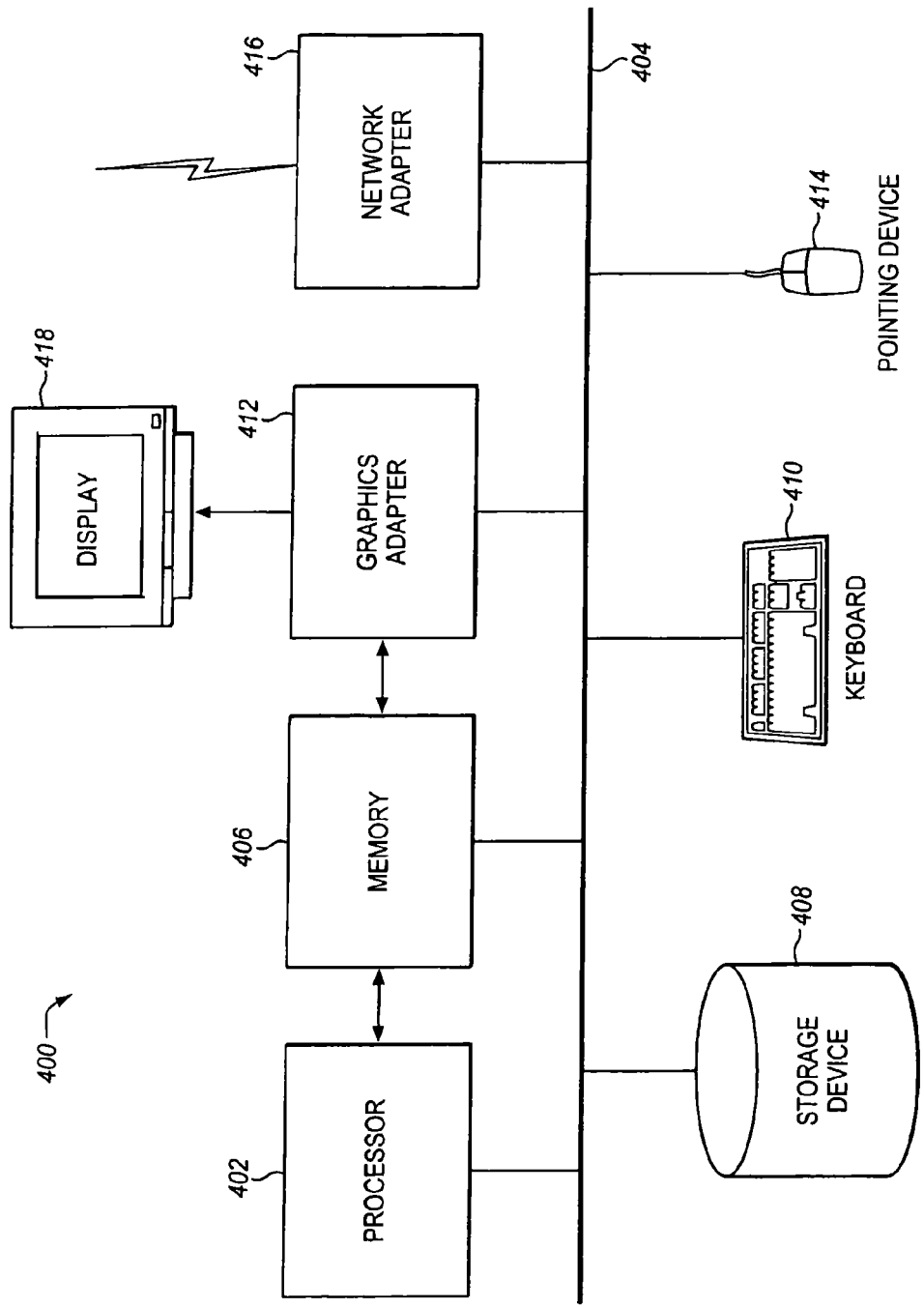
FIG. 4 is a high-level block diagram illustrating one embodiment a functional view of a typical computer for use as one of the entities illustrated in an environment according to one embodiment of the present invention.

The types of computers 400 utilized by the entities of FIG. 3 can vary depending upon the embodiment and the processing power required for the entity. For example, the client 310 typically requires less processing power than the web site 312 and server 314. Thus, the client 310 can be a personal computer, cellular telephone, etc. The web site 312 and server 314, in contrast, may comprise more powerful processors and/or multiple computers working together to provide the functionality described herein. In addition, the computers 400 can lack some of the features shown in FIG. 4. For example, a blade server supporting a web site 312 may lack a keyboard, pointing device, and display. In one embodiment, the computer 400 serving as the server 414 utilizes a processor 402 and/or memory 406 having a 64-bit word size.

Predictive Cache Loading

As discussed above, server 314 receives descriptions of relationships and provides recommendations in return. Server 314 may also dynamically build tables of relationships between execution contexts and system objects, with a correlation score of object to other objects computed by dynamic examination of the table contents.

A mechanism for enhancing recommendation system performance includes providing weight values as context to algorithms. These weight values describe relevant metadata about the object. In one embodiment, the metadata stored with the value is a time required to load the value from the backing store. In another embodiment, the metadata stored is the time since the previous request. In yet another embodiment, the metadata stored is the size of returned object.

Furthermore, it is possible to store both values, along with more metadata as available to enhance algorithmic performance. One specific embodiment of the use of this data is to more highly score values that are more difficult to load or are loaded more quickly after a given value. In another embodiment, these data vectors can be used during cache eviction to bias toward not evicting data from cache that is more expensive to recompute.

Figure 5:
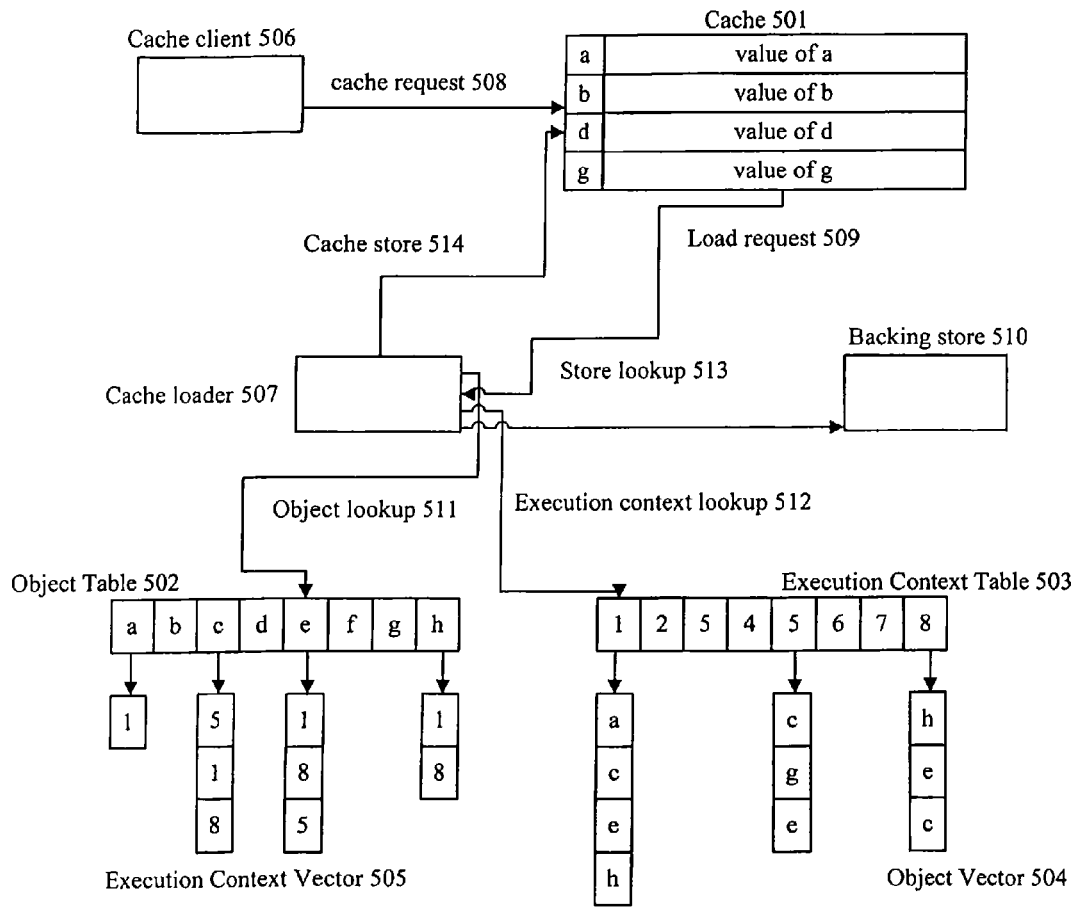
FIG. 5 is a high-level block diagram of one embodiment of a cache and execution table mechanism.

FIG. 5 illustrates one embodiment of a cache prediction mechanism. The cache 501 includes cache entries, each of which has an object ID, referred to as the cache key, described in this table as a single letter, along with its cached value. In one embodiment, the cache resides inside a single process in an operating system. In another embodiment, the cache resides in hardware on a CPU (e.g., processor 402 in FIG. 2). In another embodiment, the cache resides on a different host.

In one embodiment, the cache entries are blocks of data residing in stable storage with the object IDs being the address of the block of data on the storage. In another embodiment, the cache entries include vectors of behavior, with the object Id being the database key of a person or item the behavior relates to. Without loss of generality, the object IDs may be any logical reference to a system object.

In one embodiment, the cache value is a computed result based on the object ID. In another embodiment, the cached value is the contents of the disk block read from a storage device. Without loss of generality, the cached value of the object may be larger or smaller in storage size than the object ID, and both the object ID and cache value may be of arbitrary size depending on the embodiment. In one embodiment, a cache client 506 is included, which represents any software or application that accesses data stored in the cache 501.

In this diagram, the cache 501 includes keys and values for objects a, b, d and g. The cache client 506 initiates a cache request 508 to the cache 501 for a value of an object based on its object ID. If the cache 501 includes a value for the given object it is returned to the cache client 506. In one embodiment, the access of an existing cache key asynchronously triggers a cache load request 509. In another embodiment, the access of an existing cache key performs a synchronous load request 509. In yet another embodiment, the access of an existing cache key does not trigger a cache load request 509.

If the cache 501 does not include a value for the cache key, cache 501 initiates a request to the cache loader 507. When the cache load request 509 is triggered to the cache loader 507, the cache loader 507 initiates a lookup in an object table 502 for the object ID requested. In one embodiment, the cache loader 507 initiates an object lookup 511 before performing a store lookup 513 for the object key's value. In another embodiment, the cache loader 507 initiates an object lookup 511 after performing a store lookup 513 and returning the object value.

In one embodiment, the cache loader 507 initiates an object lookup 511 in the object table 502 for the single current object ID being requested. In another embodiment, the cache loader 507 initiates an object lookup 511 in the object table 502 for the last N object Ids requested by any cache client 506. In another embodiment, the cache loader 507 initiates an object lookup 511 for the last N object IDs requested only by the current cache client 506.

The cache loader 507 retrieves the set of execution context vectors, which includes a set of execution context IDs that uniquely identify the execution context, from the execution context table 505 that correspond to the keys that it looked up in the object table. For every execution context ID, represented in FIG. 5 by a single digit, in execution context vectors 505, the cache loader 507 initiates an execution context lookup 512 to the execution context table 503, obtaining the object vector 504 whose values are composed of object IDs. In one embodiment, the values in execution context vectors 505 and object vectors 504 are sorted by time of the event for a scoring algorithm that uses time data. In another embodiment, the values in the vectors are unsorted.

The cache loader 507 then uses the contents of the execution context vectors 505 and the object vectors 504 in combination with a scoring algorithm (e.g. as discussed above with regard to FIG. 1) to select highly scored object values to load in the cache 501. In one embodiment, the execution context vectors 505 and object vectors 504 include other metadata about the objects and execution vectors which are used in the scoring algorithm. In a preferred embodiment, the scoring algorithm is one of Cosine, Dice or Jaccard.

The highly scored object values obtained by the scoring algorithm are then sent to backing store 510 via a store lookup 513. Without loss of generality, this backing store 510 can be either a static data store or a computational process with or without backing data that generates values for the object keys. Once the object contents for the submitted object IDs are obtained from the backing store 510, they are inserted into the cache via a cache store request 514, and made available to satisfy future object value requests.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for populating a cache, comprising:
    retrieving a set of execution context IDs from an object table, wherein the set of execution context IDs is associated with an object value;
    performing an execution context lookup in an execution context table for every retrieved execution context ID to determine a set of objects to be retrieved from a backing store; and
    retrieving the set of objects from the backing store and pre-loading the set of objects into the cache.

2. The method of claim 1, wherein accessing an existing object asynchronously triggers a cache load request.

3. The method of claim 1, wherein accessing an existing object causes a synchronous load request to be performed.

4. The method of claim 1, further comprising:
    performing a store lookup;
    returning an object value from the store lookup; and
    performing an object lookup using the object value.

5. The method of claim 1, further comprising performing an object lookup in the object table for a predetermined number of object IDs requested by two or more cache clients.

6. The method of claim 1, further comprising performing an object lookup in the object table for a predetermined number of object IDs.

7. The method of claim 1, wherein each member of the set of execution context IDs uniquely identifies an execution context for accessing an existing object.

8. The method of claim 7, wherein the values in execution context IDs and the object IDs in the execution context table are sorted by time of an event for a scoring algorithm that uses time data.

9. The method of claim 1, further comprising using the execution context vectors and the object vectors with a scoring algorithm to select highly scored object values to load in the cache.

10. The method of claim 9, wherein the scoring algorithm considers information about the time required to retrieve values from a data store.

11. A system comprising:
    a cache to receive access requests from a client to retrieve a value of an object based on an object identification (ID); and
    a cache loader to retrieve a set of execution context IDs from an object table, wherein the set of execution context IDs is associated with an object value, the cache loader being further configured to perform an execution context lookup in an execution context table for every retrieved execution context ID to determine a set of objects to be retrieved from a backing store and to pre-load the set of objects into the cache.

12. The system of claim 11, wherein the cache loader performs a store lookup and returns an object value from the store lookup prior to performing an object lookup.

13. The system of claim 11, wherein the cache loader performs an object lookup in the object table for a predetermined number of object IDs requested by two or more cache clients.

14. The system of claim 11, wherein the cache loader performs an object lookup in the object table for a plurality of object IDs.

15. A non-transitory computer-readable medium storing associated data, wherein the data, when accessed, results in a machine performing operations comprising:
- retrieving a set of execution context IDs from an object table, wherein the set of execution context IDs is associated with an object value; and
- performing an execution context lookup in an execution context table for every retrieved execution context ID to determine a set of objects to be retrieved from a backing store; and
- retrieving the set of objects from the backing store and pre-loading the set of objects into the cache.

* * * * *